(No Model.)

G. W. DEANE.
FRUIT WASHER.

No. 550,363. Patented Nov. 26, 1895.

Witnesses

Inventor
George W. Deane

UNITED STATES PATENT OFFICE.

GEORGE W. DEANE, OF RIVERSIDE, CALIFORNIA.

FRUIT-WASHER.

SPECIFICATION forming part of Letters Patent No. 550,363, dated November 26, 1895.

Application filed August 15, 1895. Serial No. 559,408. (No model.)

*To all whom it may concern:*

Be it known that I, GEORGE W. DEANE, a citizen of the United States, residing at Riverside, in the county of San Bernardino and State of California, have invented certain new and useful Improvements in Fruit-Washers; and I do declare the following to be a full, clear, and exact description of the invention, such as will enable others skilled in the art to which it appertains to make and use the same.

My invention relates to fruit-washers, and is especially designed for the purpose of washing oranges.

The object of the invention is to provide a machine of this character which shall be simple of construction, durable in use, and comparatively inexpensive of production.

With these objects in view the invention consists of certain features of construction and combination of parts, which will be hereinafter fully described and claimed.

Figure 1:
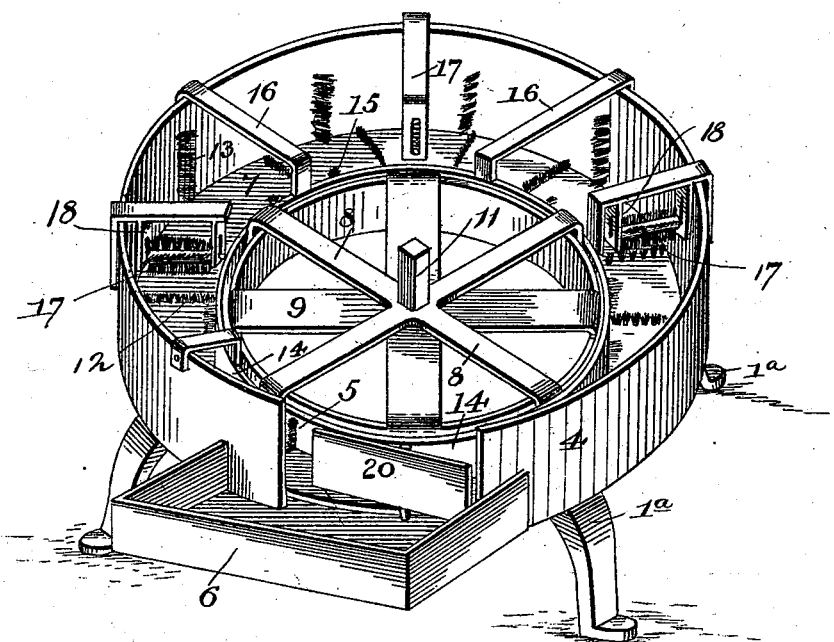
Figure 2:
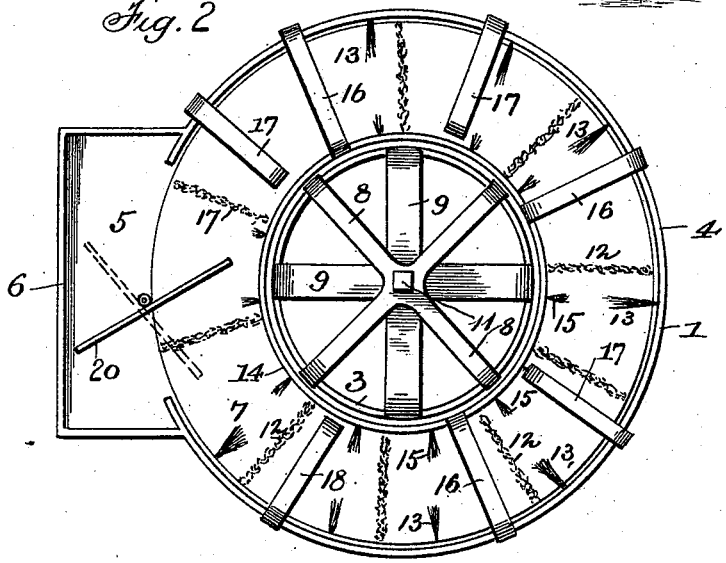
Figure 3:
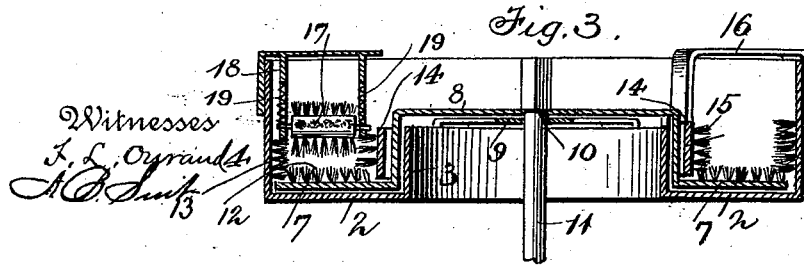

In the accompanying drawings, Figure 1 is a perspective view of my improved fruit-washer. Fig. 2 is a top plan view of the same, showing in dotted lines the guide adjusted to direct the oranges into the box at the side of the trough when the rotation of the removable brushes is changed. Fig. 3 is a vertical sectional view.

In the drawings, 1 denotes a circular trough, consisting of the bottom 2 and concentric inner and outer sides 3 and 4, respectively. This trough may be supported by standards 1ª. The outer side 4 of the trough is cut away, as shown at 5, and communicates with a box 6, which is attached to the outer side of the trough.

7 denotes a ring, which is placed in the bottom of the trough around the inner side 3 of the trough, and to this ring are secured metal strips 8, the lower ends of which are bent laterally and are bolted or soldered to the ring, and thence project upwardly and inwardly toward the center of the opening formed by the inner side of the trough. Cross-pieces 9 are secured to the inner side of the trough and are provided with a bearing 10, through which an operating-shaft 11 projects and is secured to the ends of the strips. This shaft may be rotated from any suitable source of power, and will cause the ring to be rotated around the trough. The ring is provided with a set of upwardly-extending brushes 12, while the outer side of the trough is provided with laterally-extending brushes 13. A circular band 14 is placed around the inner side of the trough and is provided with laterally-extending brushes 15. This band is fixed and has no movement whatever. I have shown it in the accompanying drawings as being fixed to rods 16, which are secured to the outer side of the trough.

17 denotes vertical movable spring-actuated brushes, which are located within the trough and are supported by rods 18, secured to the outer side of the trough and having springs 19 about said rods, the energy of which springs is exerted to force the brushes downward and to cause them to have a yielding action upon the fruit in the trough so that fruit of different sizes will be cleansed.

20 denotes a guide, which is secured in the box at the side of the trough and projects inward at a tangent to the trough. This guide may be connected with the trough so as to be adjusted to receive the fruit from the ring when it is rotated in either direction. A simple way of attaching the guide is as shown in the accompanying drawings, in which I have illustrated the guide as being pivoted to the trough, so that when the ring is operated in an opposite direction to that indicated by the arrow in Fig. 2 the guide may be swung around, as shown in dotted lines in said figure, so that the fruit will be directed into the box at the side of the trough.

In operation the fruit to be washed is placed in the trough, which is filled with water, at one side of the guide, and the ring, being rotated, will cause the fruit to be carried around past the brushes in the direction of the arrow in Fig. 2, which will effectively remove all foreign substance, such as grit and dirt. A continual rotation of the ring in the direction indicated by the arrow will eventually cause the tufts of the brushes to bend or slant in that direction, and to overcome this I have made the guide adjustable, so that when a reverse motion is imparted to the shaft the fruit will be directed into the box by the guide. This arrangement insures the fruit being properly washed, as otherwise the brushes would soon be pressed flat toward the sides of the trough and would allow the fruit to pass without coming in contact with them.

Having thus described my invention, what I claim, and desire to secure by Letters Patent, is—

1. The combination with a circular trough, having brushes upon the inner face of its outer side, a rotary ring mounted in the trough, a stationary band provided with brushes, and spring-actuated, vertical, movable brushes supported above the ring, substantially as set forth.

2. The combination with a trough, consisting of a bottom and the inner and outer sides, the outer side of which is cut away, a box secured to the outer side and communicating with the trough, a guide extending tangentially to the inner side of the trough across the same and leading into the box, a rotary ring in the trough, laterally projecting opposing brushes in the trough, and a vertical movable brush supported in the trough, substantially as set forth.

3. The combination with a trough, having an opening in its side, a box secured to the side opposite the opening, a guide extending tangentially across the trough and leading into the box, a ring supported on the bottom of the trough, a connection between the operating shaft and the ring, whereby the motion of the shaft is imparted to the ring, a fixed band located in the trough, said band and the inner face of the outer side of the trough being provided with opposing laterally projecting brushes, and vertical, movable, spring-actuated brushes secured over the ring in the trough, substantially as set forth.

In testimony whereof I affix my signature in presence of two witnesses.

GEORGE W. DEANE.

Witnesses:
H. W. BROOKS,
ROBERT DUNCAN.